United States Patent
Erben et al.

(10) Patent No.: US 6,655,634 B2
(45) Date of Patent: Dec. 2, 2003

(54) ARRANGEMENT FOR MOVING AN AIRPLANE DOOR SWIVELLABLY DISPOSED ON A SUPPORTING ARM

(75) Inventors: Hannes Erben, Donauwörth (DE); Alexander Engleder, Taufkirchen (DE)

(73) Assignee: Eurocopter Deutschland GmbH, Donauworth (DE)

( * ) Notice: Subject to any disclaimer, the term of this patent is extended or adjusted under 35 U.S.C. 154(b) by 0 days.

(21) Appl. No.: 10/108,644

(22) Filed: Mar. 29, 2002

(65) Prior Publication Data
US 2002/0139897 A1 Oct. 3, 2002

(30) Foreign Application Priority Data
Mar. 30, 2001 (DE) .......................... 101 16 216

(51) Int. Cl.⁷ ................................ B64C 1/14
(52) U.S. Cl. .................. 244/129.5; 49/246; 16/366
(58) Field of Search ................ 244/129.4, 129.5, 244/118.1; 49/236–246, 37, 386, 248–249; 16/366, 303–309, 311–317, 370, 56, 58

(56) References Cited
U.S. PATENT DOCUMENTS

| | | | | |
|---|---|---|---|---|
| 3,004,303 A | * | 10/1961 | Wilmer ................. | 244/129.5 |
| 4,474,348 A | * | 10/1984 | Skotte ................. | 244/139.5 |
| 4,720,065 A | * | 1/1988 | Hamatani .............. | 244/129.5 |
| 5,180,121 A | | 1/1993 | Banks et al. | |
| 5,289,615 A | * | 3/1994 | Banks et al. .......... | 244/129.5 |
| 5,305,969 A | * | 4/1994 | Odell et al. ........... | 244/129.5 |
| 6,116,542 A | * | 9/2000 | Erben ................. | 244/129.5 |

FOREIGN PATENT DOCUMENTS

| | | |
|---|---|---|
| DE | 4022067 | 1/1992 |
| DE | 19702083 | 6/1998 |
| DE | 19948844 | 4/2001 |

* cited by examiner

Primary Examiner—Galen L. Barefoot
(74) Attorney, Agent, or Firm—Crowell & Moring LLP

(57) ABSTRACT

An airplane door is swivellably disposed on a supporting arm, the supporting arm being swivellably disposed on an opening frame of a fuselage, and including a driving device for lifting and lowering the door and another driving device for swivelling the door and the supporting arm. During the movement of the lifting or lowering of the door, the transmission line of the driving device for the swivelling is uncoupled so that it is not unnecessarily mechanically stressed and a jamming of the transmission line therefore basically does not occur.

8 Claims, 5 Drawing Sheets

ARRANGEMENT FOR MOVING AN AIRPLANE DOOR SWIVELLABLY DISPOSED ON A SUPPORTING ARM

This application claims the priority of German application 101 16 216.2, filed Mar. 30, 2001, the disclosure of which is expressly incorporated by reference herein.

BACKGROUND AND SUMMARY OF THE INVENTION

The invention relates to an arrangement for moving an airplane door swivellably disposed on a supporting arm, the supporting arm being swivellably disposed on an opening frame of the fuselage, and including a driving device for lifting and lowering the door and another driving device for swivelling the door and the supporting arm arranged. The airplane door is a passenger door. The moving of a door during the opening or closing operation relates to the swivelling of the door as well as to the lifting and lowering of the door.

A driving device, which operates by way of a lift shaft disposed in the door, is assigned to the lifting device. This lift shaft is moved by the driving device by way of power transmission elements. At its ends, the lift shaft has roller levers which can be disposed in receiving elements of the frame. The roller levers are moved completely out of the frame-side receiving elements only with the start of the swivelling.

The swivelling motion is generated by another driving device. In the case of a known door, this driving device for the swivelling is in a constant engagement with the supporting arm. The driving device for the swivelling is arranged in the door structure. When the door is lifted, a relative movement of the door takes place with respect to the supporting arm. The driving device for the swivelling is also lifted or lowered with respect to the supporting arm, so that the existing mechanical connection (transmission line) between the driving device for the swivelling and the supporting arm is subjected to undesirable stress. The stress of the constant mechanical connection between the driving device and the supporting arm could result in a play after frequent usage which may lead to a jamming of the mechanical connection.

It is an object of the invention to construct, in the case of a driving device for swivelling an airplane door, the transmission line such that a continuous functioning of the transmission line with respect to an airplane door disposed on a supporting arm is ensured.

This object of the invention can be achieved according to certain preferred embodiments of the invention by providing an arrangement for moving an airplane door swivellably disposed on a supporting arm, the supporting arm being swivellably disposed on an opening frame of the fuselage, and including a driving device for lifting and lowering the door and another driving device for swivelling the door and the supporting arm, wherein the driving device for the swivelling has a drivable engaging element arranged on its output which, when the door is lifted, engages with a receiving element which is arranged on the supporting arm, and the drivable engaging element and the receiving element form a coupling device for transmitting the swivelling force.

This object of the invention can also be achieved according to certain preferred embodiments of the invention by providing an arrangement for moving an airplane door swivellably disposed on a supporting arm, the supporting arm being swivellably disposed on an opening frame of the fuselage, and including a driving device for lifting and lowering the door and another driving device for swivelling the door and the supporting arm, wherein the driving device for the swivelling is arranged on the supporting arm and a drivable engaging element is arranged at the output of the driving device, which engaging element, during the lifting of the door, engages with a receiving element arranged at the door, and the drivable engaging element and the receiving element form a coupling device for transmitting the swivelling force.

This object of the invention can be achieved according to certain preferred embodiments of the invention by providing an arrangement for moving an airplane door swivellably disposed on a supporting arm, the supporting arm being swivellably disposed on an opening frame of the fuselage, including a driving device for lifting and lowering the door and another driving device for swivelling the door and the supporting arm, wherein the driving device for the swivelling is arranged on the frame of the fuselage and a drivable engaging element is arranged at the output of the driving device, which engaging element, during the lifting of the door and the supporting arm, engages with a receiving element arranged on the supporting arm, and the drivable engaging element and the receiving element form a coupling device for transmitting the swivelling force.

This object of the invention can be achieved according to certain preferred embodiments of the invention by providing an arrangement for moving an airplane door swivellably disposed on a supporting arm, the supporting arm being swivellably disposed on an opening frame of the fuselage, including a driving device for lifting and lowering the door and another driving device for swivelling the door and the supporting arm, wherein the driving device for the swivelling is arranged on the supporting arm and a drivable engaging element is arranged at the output of the driving device, which engaging element, during the lifting of the door and of the supporting arm, engages with a receiving element arranged on the door frame of the fuselage, and the drivable engaging element and the receiving element form a coupling device for transmitting the swivelling force.

The invention has the advantage that, during movement of the lifting or lowering of the door or of the door together with the supporting arm, the transmission line of the driving device for the swivelling is not unnecessarily mechanically stressed and thus a jamming of this transmission line basically does not occur.

other objects, advantages and novel features of the present invention will become apparent from the following detailed description of the invention when considered in conjunction with the accompanying drawings.

DETAILED DESCRIPTION OF THE DRAWINGS

Figure 2:
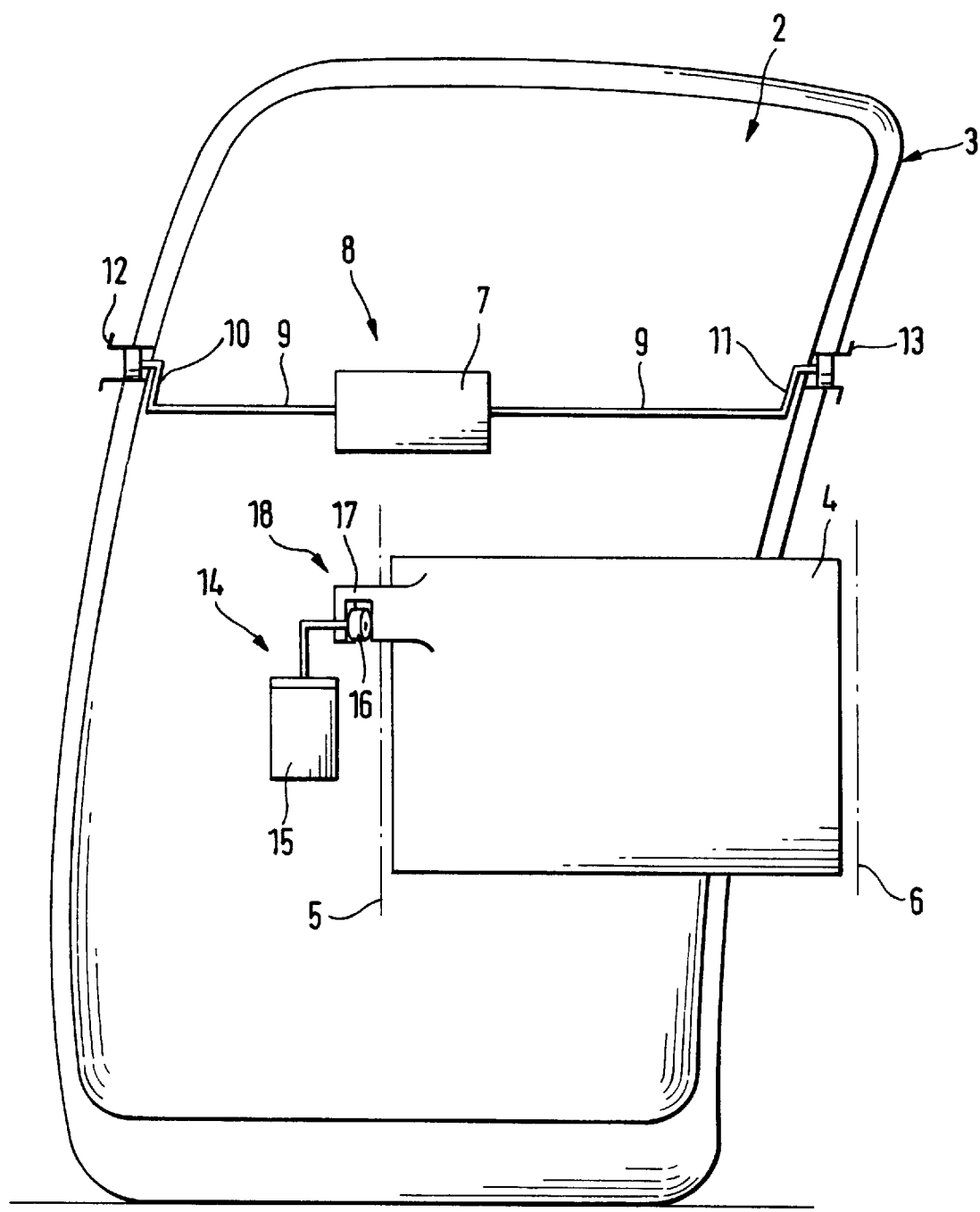
FIG. 2 is a schematic view of the arrangement of FIG. 1, shown with the door in a lifted position.

FIG. 2 illustrates the lifted condition of the door, so that the swivel drive arranged in the door structure and having the drivable engaging element 16 engages with the fixed receiving element 17 of the supporting arm 4. This form- and force-locking coupling will be separated again when, during a closing operation, the door is lowered again into the closed condition.

Figure 1:
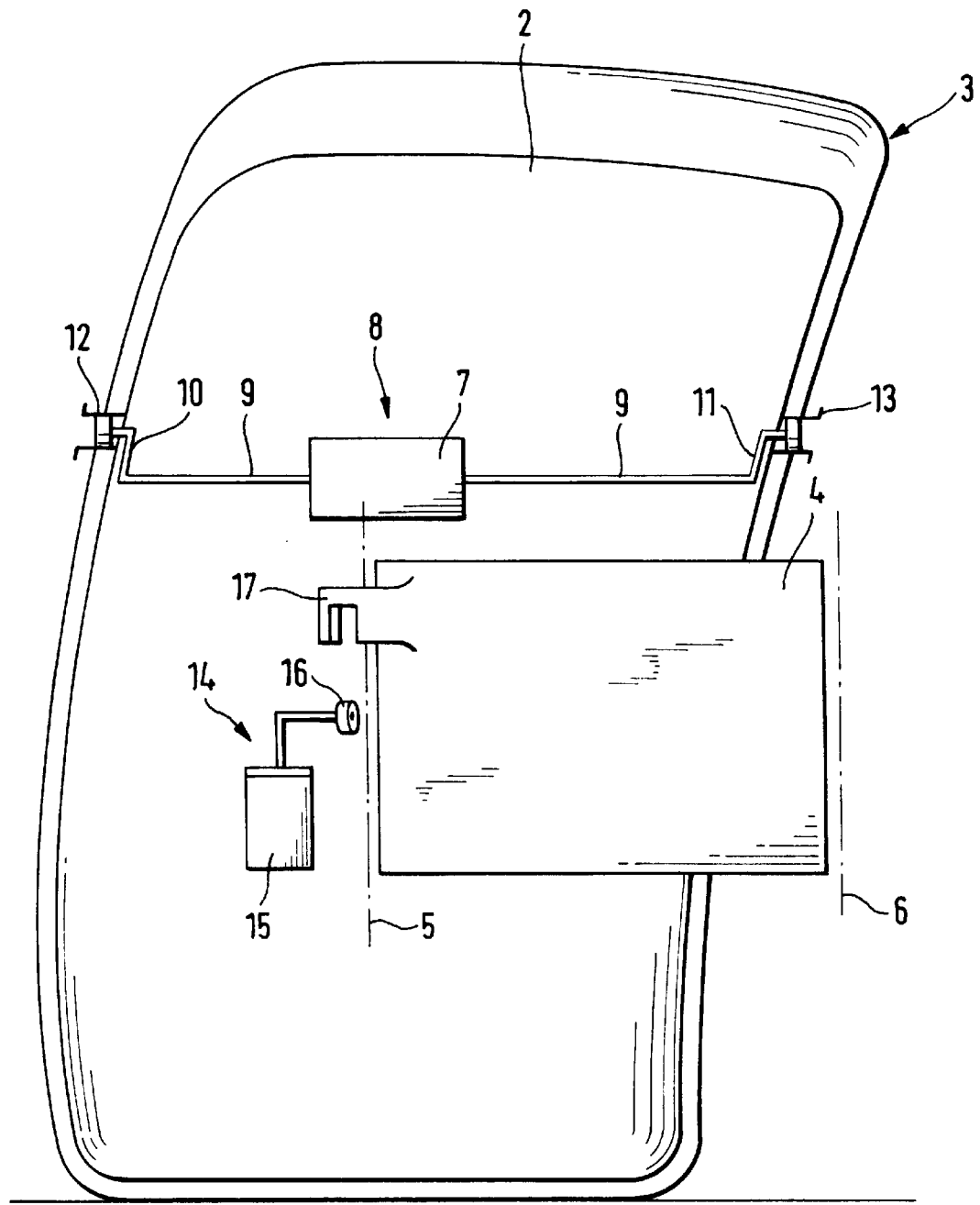
FIG. 1 is a schematic view of a door fuselage, shown with the door in a closed lowered position of the door, constructed according to a preferred embodiment of the present invention.
Figure 3:
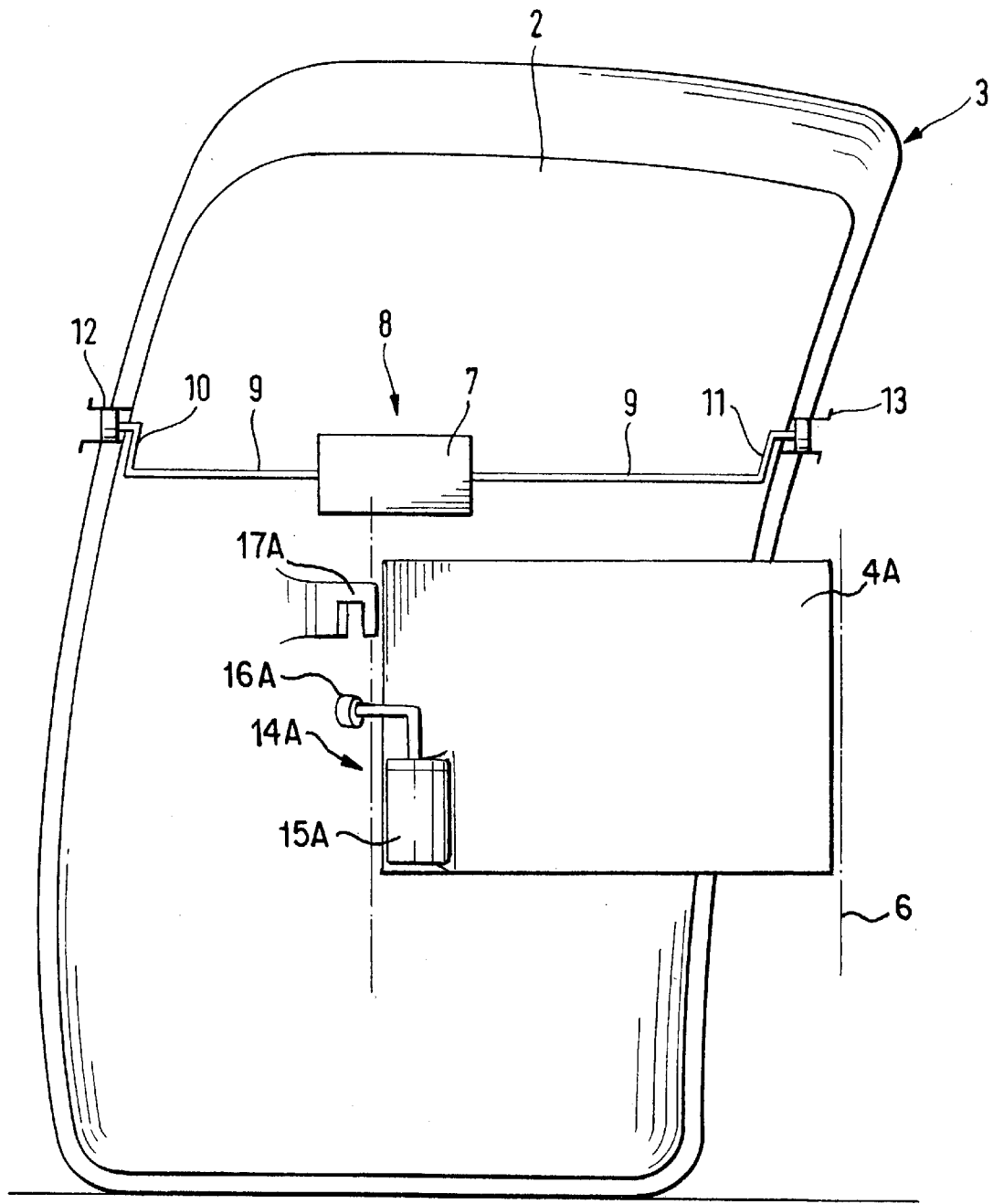
FIG. 3 is a schematic view of a door fuselage, shown with the door in a closed lowered position of the door, constructed according to a second preferred embodiment of the present invention.

The example illustrated in FIGS. 1 and 2 is exemplary and other embodiments are contemplated. The invention can also be implemented if the driving device for the swivelling is arranged on the supporting arm as shown in FIG. 3. In FIG. 3, similar reference characters are included as in FIG. 1 for similar elements. In FIG. 3, the output of the driving device 15A also has a drivable engaging element 16A, and a receiving element 17A is arranged at the door 2. During the lifting of the door 2, the receiving element 17A, in the end position of the lifting, could engage with the drivable engaging element 16A of the driving device 15A. During this operation, the supporting arm 4A would also not be lifted.

Figure 4:
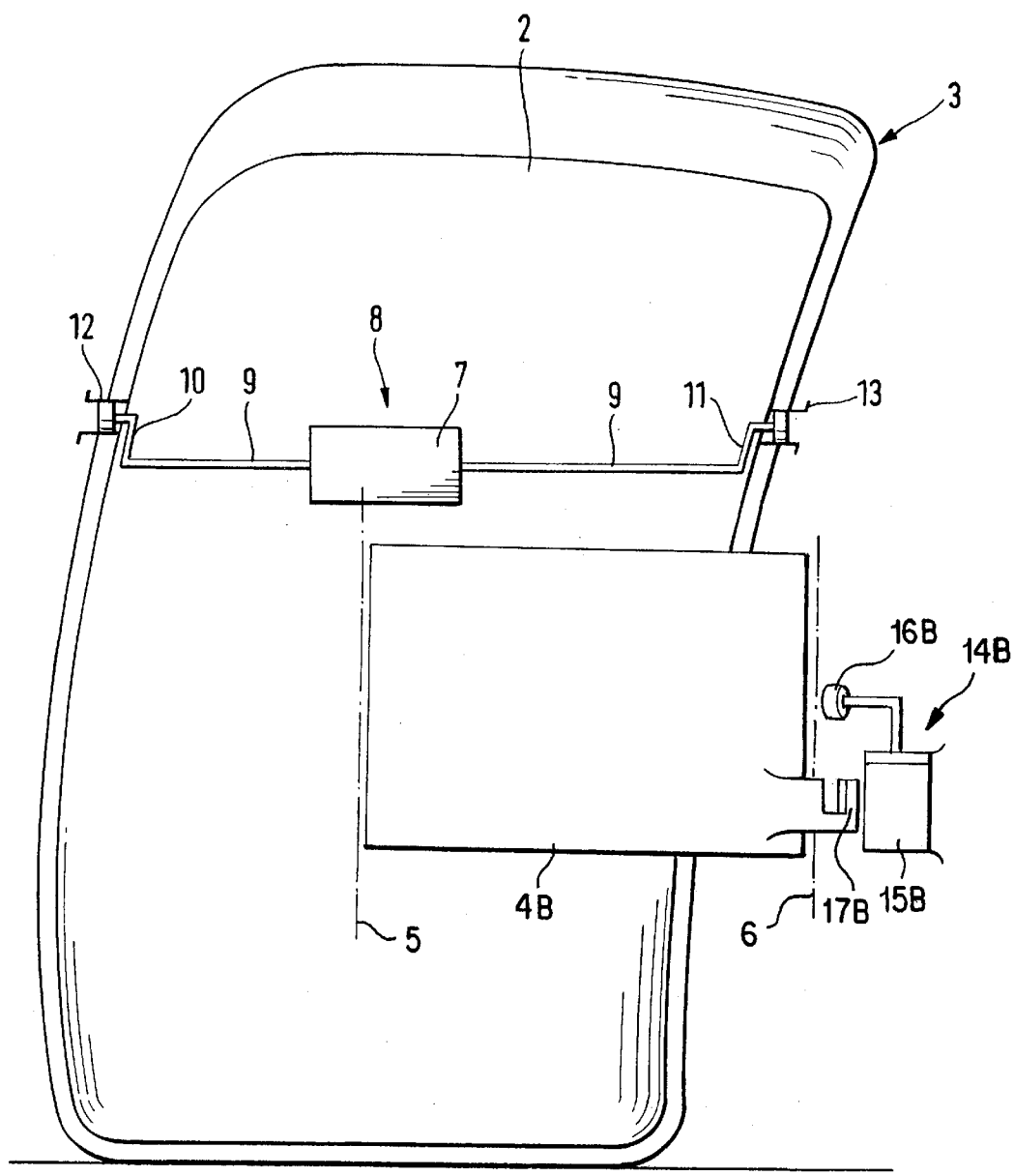
FIG. 4 is a schematic view of a door fuselage, shown with the door in a closed lowered position of the door, constructed according to a third preferred embodiment of the present invention.

An application case is contemplated in which the door as well as the supporting arm connected with the door can be lifted and lowered as illustrated in FIG. 4. In FIG. 4, similar reference characters are included as in FIG. 1 for similar elements. It is expedient in such a case that driving devices 15B for the swivelling be arranged on the door frame of the fuselage in a stationary position. The supporting arm 4B will then receive the receiving element 17B. During the lifting of the door and of the supporting arm 4B the receiving element 17B must be positioned on the supporting arm 4B such that, with the ending of the lifting operation, it is fully engaged with the drivable engaging element 16B of the driving device 15B.

A reverse solution possibility can also be implemented in which the driving device with the drivable engaging element is arranged on the supporting arm to be lifted and the receiving element is arranged on the door frame of the fuselage.

The invention has the advantage that, during the movement of the lifting or lowering of the door, the transmission line of the driving device 15 is not unnecessarily mechanically loaded and therefore a jamming of the transmission line basically does not occur.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Figure 5:
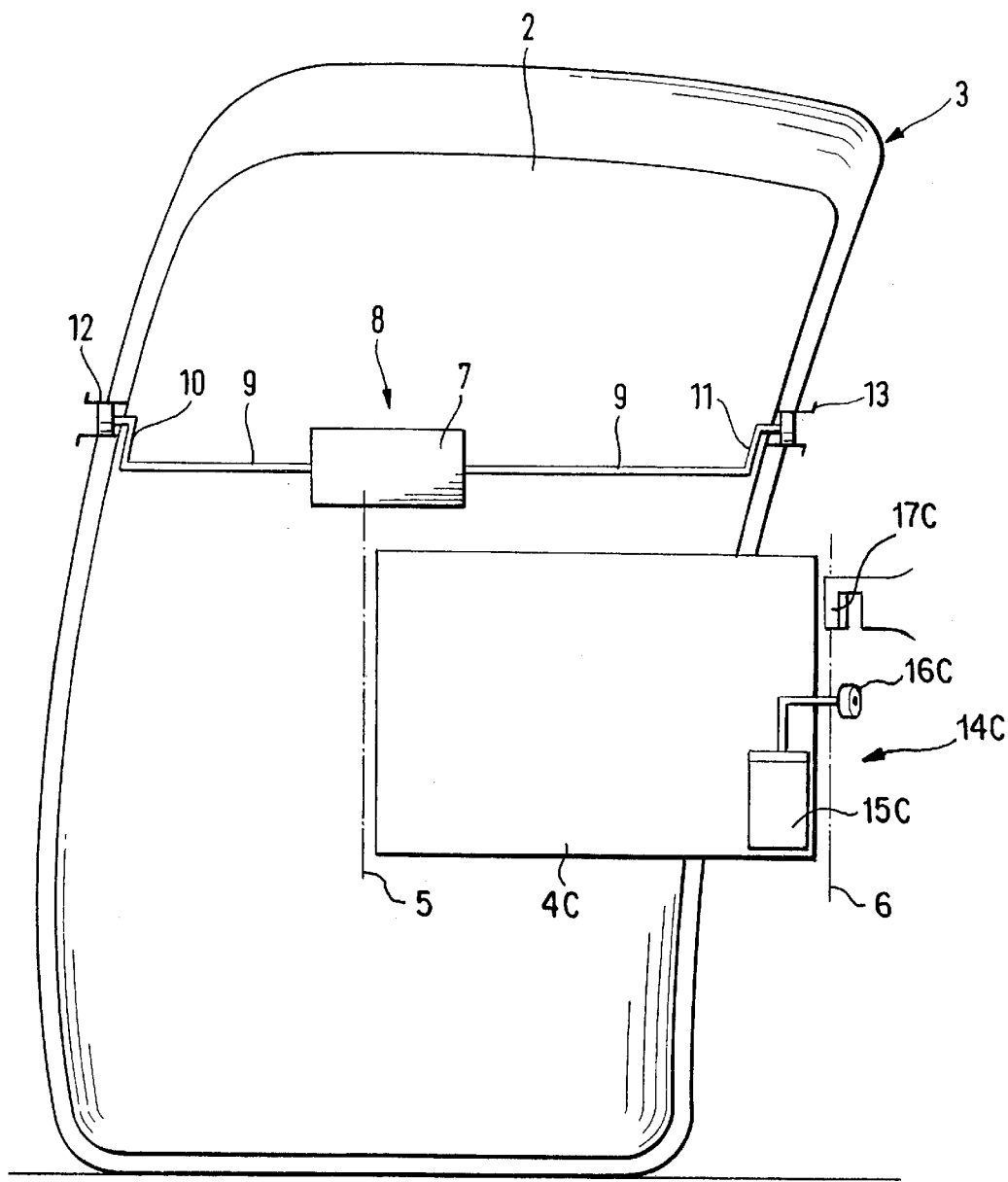
FIG. 5 is a schematic view of a door fuselage, shown with the door in a closed lowered position of the door, constructed according to a fourth preferred embodiment of the present invention.

A reverse solution possibility can also be implemented in which the driving device with the drivable engaging element is arranged on the supporting arm to be lifted and the receiving element is arranged on the door frame of the fuselage as illustrated in FIG. 5. In FIG. 5, similar reference characters are included as in FIG. 1 for similar elements. In FIG. 5, the driving device 15C for the swivelling is arranged on the supporting arm 4C and a drivable engaging element 16C is arranged at the output of the driving device 15C, which engaging element 16C, during the lifting of the door 2 and the supporting frame arm 4C, engaged with the receiving element 17C arranged on the door frame of the fusealage, and the drivable engaging element 16C and the receiving element 17C form a coupling device for transmitting a swivelling force.

We claim:

1. Arrangement for moving an airplane door swivellably disposed on a supporting arm, the supporting arm being swivellably disposed on an opening frame of the fuselage, and including a driving device for lifting and lowering the door and another driving device for swivelling the door and the supporting arm, wherein the driving device for the swivelling has a drivable engaging element arranged on its output which, when the door is lifted, engages with a receiving element which is arranged on the supporting arm, and the drivable engaging element and the receiving element form a coupling device for transmitting the swivelling force.

2. Arrangement for moving an airplane door swivellably disposed on a supporting arm, the supporting arm being swivellably disposed on an opening frame of the fuselage, and including a driving device for lifting and lowering the door and another driving device for swivelling the door and the supporting arm, wherein the driving device for the swivelling is arranged on the supporting arm and a drivable engaging element is arranged at the output of the driving device, which engaging element, during the lifting of the door, engages with a receiving element arranged at the door, and the drivable engaging element and the receiving element form a coupling device for transmitting the swivelling force.

3. Arrangement for moving an airplane door swivellably disposed on a supporting arm, the supporting arm being swivellably disposed on an opening frame of the fuselage, including a driving device for lifting and lowering the door and another driving device for swivelling the door and the supporting arm, wherein the driving device for the swivelling is arranged on the frame of the fuselage and a drivable engaging element is arranged at the output of the driving device, which engaging element, during the lifting of the door and the supporting arm, engages with a receiving element arranged on the supporting arm, and the drivable engaging element and the receiving element form a coupling device for transmitting the swivelling force.

4. Arrangement for moving an airplane door swivellably disposed on a supporting arm, the supporting arm being swivellably disposed on an opening frame of the fuselage, including a driving device for lifting and lowering the door and another driving device for swivelling the door and the supporting arm, wherein the driving device for the swivelling is arranged on the supporting arm and a drivable engaging element is arranged at the output of the driving device, which engaging element, during the lifting of the door and of the supporting arm, engages with a receiving element arranged on the door frame of the fuselage, and the drivable engaging element and the receiving element form a coupling device for transmitting the swivelling force.

5. An airplane assembly comprising:

a fuselage part with a passenger door opening, a door, and a door support assembly operable to move the door between a door opening closing position and an open position, wherein the door support assembly includes:
- a supporting arm pivotal about a supporting arm pivot axis disposed on the fuselage part,
- a door lifting device operable to lift and lower the door,
- a door swivelling device for accommodating swivelling of the door with respect to the supporting arm about a door swivel axis disposed on the supporting arm, and
- a detachable coupling between the door swivelling arm and the door swivelling device,
- wherein said detachable coupling is configured to separate the door swivelling arm and the door swivelling device from one another when said door is in a lower closed position and to connect the door swivelling arm and the door swivelling device when said door is in a raised position during opening of said door.

6. An airplane assembly according to claim 5, wherein said door swivelling device includes a drivable engaging element which is selectively form lockingly engageable with an engaging element of said supporting arm.

7. An airplane assembly according to claim 6, wherein said supporting arm pivot axis and door swivel axis are substantially parallel with one another.

8. An airplane assembly according to claim 6, wherein said door lifting device includes a lift shaft with roller levers engageable with fuselage part receiving element.

* * * * *